United States Patent [19]

Fisher

[11] 3,951,234

[45] Apr. 20, 1976

[54] PIN BEARINGS

[75] Inventor: Noel McNeill Fisher, Kuala Lumpur, Malaysia

[73] Assignee: Associated Mines (Malaya) Sendirian Berhad, Kuala Lumpur, Malaysia

[22] Filed: Jan. 30, 1975

[21] Appl. No.: 545,705

[30] Foreign Application Priority Data

Feb. 5, 1974 United Kingdom............. 5354/74
Feb. 26, 1974 United Kingdom............. 8698/74

[52] U.S. Cl. .............................. 184/7 R; 184/41; 308/9; 37/192 R; 37/69
[51] Int. Cl.² ....................................... F16N 25/02
[58] Field of Search............. 184/1 R, 7 R, 39, 41; 308/9, 122; 37/191, 192, 69, 141

[56] References Cited
UNITED STATES PATENTS

| 2,528,195 | 10/1950 | Bolhar | 37/191 R |
| 3,526,299 | 9/1970 | Kiefer | 184/39 |

FOREIGN PATENTS OR APPLICATIONS

| 655,179 | 7/1951 | United Kingdom | 37/192 |
| 592,364 | 9/1947 | United Kingdom | 37/69 |
| 597,917 | 2/1948 | United Kingdom | 37/191 R |

Primary Examiner—Richard C. Pinkham
Assistant Examiner—Marvin Siskind
Attorney, Agent, or Firm—Haseltine, Lake & Waters

[57] ABSTRACT

A pin bearing lubrication system is described which comprises a pin bearing having a bush recessed each end thereof; a sealing ring disposed in each recess in the bush; a bearing pin passing through the bush and forming seals with the sealing rings; a reservoir for lubricant formed in the bearing pin; a duct formed the bearing pin connecting the reservoir with bearing surfaces formed between the bush and the bearing pin; and a diaphragm movable in and relative to the reservoir, the arrangement being such that the diaphragm is acted upon by the pressure prevailing outside the bearing pin and by a biasing spring so as to urge the diaphragm in a direction tending to reduce the volume of the reservoir. Such a pin bearing lubrication system may be incorporated in, for example, a chain of dredge buckets which are hinged together by pin bearings.

16 Claims, 4 Drawing Figures

PIN BEARINGS

BACKGROUND OF THE INVENTION

1. Field of the Invention

This invention relates to pin bearings and, more particularly, is concerned with pin bearing lubrication systems for use, inter alia, in dredge buckets.

2. Description of the Prior Art

Dredge buckets such as that shown in FIG. 1 of the accompanying drawings are used for removing material from, for example, sea beds or river beds. The material removed can vary from soft silt to hard rock which is broken up and removed by the action of the dredge buckets. Generally, a number of dredge buckets are hinged together by means of pins passing through holes formed in each pair of buckets to form a bucket chain. Dredging operations unavoidably result in a certain amount of disturbed material, e.g. sand or particles of other solid matter, around the dredge buckets which disturbed material may get between the pins and the holes thus resulting in wear of the pins and the holes.

It is known to provide rubber sealing rings in pin bearings for use inter alia with dredge buckets (see for example, British Patent Specification No. 655,179). The sealing rings are for retaining lubricant in the pin bearings between the pin and the bush and thus serve to reduce wear of the bearing surfaces. However, such sealing rings are often used under arduous conditions and it is very difficult to prevent leakage of lubricant or ingress of water or particles of solid matter, each of which can result in increased wear of the bearing surfaces.

BRIEF SUMMARY OF THE INVENTION

It is an object of the present invention to provide a pin bearing in which the rate of wear of the bearing surfaces is reduced.

According to the present invention, therefore, there is provided a pin bearing lubrication system which comprises a pin bearing having a bush recessed each end thereof, a sealing ring disposed in each recess in the bush, a bearing pin passing through the bush and forming seals with the sealing rings, a reservoir for lubricant formed in the bearing pin, a duct formed in the bearing pin connecting the reservoir with bearing surfaces formed between the bush and the bearing pin, and a diaphragm movable in and relative to the reservoir, the arrangement being such that the diaphragm is acted upon by the pressure prevailing outside the bearing pin and by biasing means acting between the diaphragm and the bearing pin so as to urge the diaphragm in a direction tending to reduce the volume of the reservoir.

In one form of the invention the bush comprises two parts; an outer bush to which the retaining plate is fixed and an inner bush forming that part of the bearing in contact with the bearing pin.

Advantageously, the sealing rings are made of an elastomeric material, e.g. a natural or synthetic rubber; they can, however, be made of any suitable material. Each sealing ring is provided with a garter spring, which garter spring increases the pressure exerted by the sealing rings on the surface of the bearing pin and thereby improves the effectiveness of the seals. The sealing rings may also be provided with a cylindrical surface resting on the surface of the bearing pin, thereby providing additional protection against the ingress of particles.

In one embodiment of the invention each sealing ring is retained in a recessed bush and urged against the end of the bush by an annular plate fixed to the bush. The sealing ring may also be provided with an annular ring projecting from the surface of the sealing ring, which annular ring is urged against the surface of the annular plate, creating a seal at the area of contact and substantially eliminating any loss of lubricant around the sealing ring. Advantageously that part of the sealing ring which is urged against the bush is provided with notches to allow lubricant to flow to the seal between the annular plate and the annular ring projecting from the surface of the sealing ring.

The diaphragm may comprise a flexible sleeve fastened around a rigid portion. Advantageously, the rigid portion is a spring-retaining cup which houses the biasing means, which biasing means is in the form of a coil spring acting between the diaphragm and an annular plate fixed to the bearing pin.

In one embodiment of the invention the system includes a pressure release valve which prevents overfilling of the system with lubricant. Advantageously the pressure release valve is disposed within a coil spring which forms the biasing means and which is housed in a spring-retaining cup forming part of the diaphragm.

A pin bearing lubrication system according to the present invention may be used for the lubrication of, for example, underwater bearings or the pin bearings of dredge buckets.

For a better understanding of the invention and to show more clearly how the same may be carried into effect reference will now be made, by way of example, to the accompanying drawings.

DETAILED DESCRIPTION OF THE INVENTION

Figure 1:
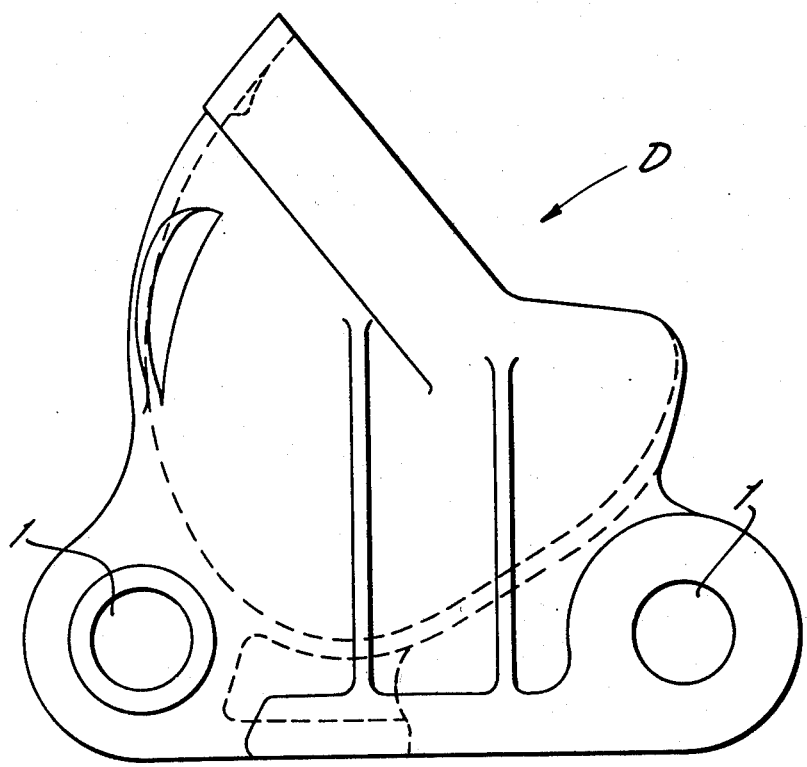
FIG. 1 is a view of a dredge bucket provided with two pin bearings.

FIG. 1 shows a dredge bucket D which is provided with two pin bearings each including a bearing pin 1.

Figure 2:
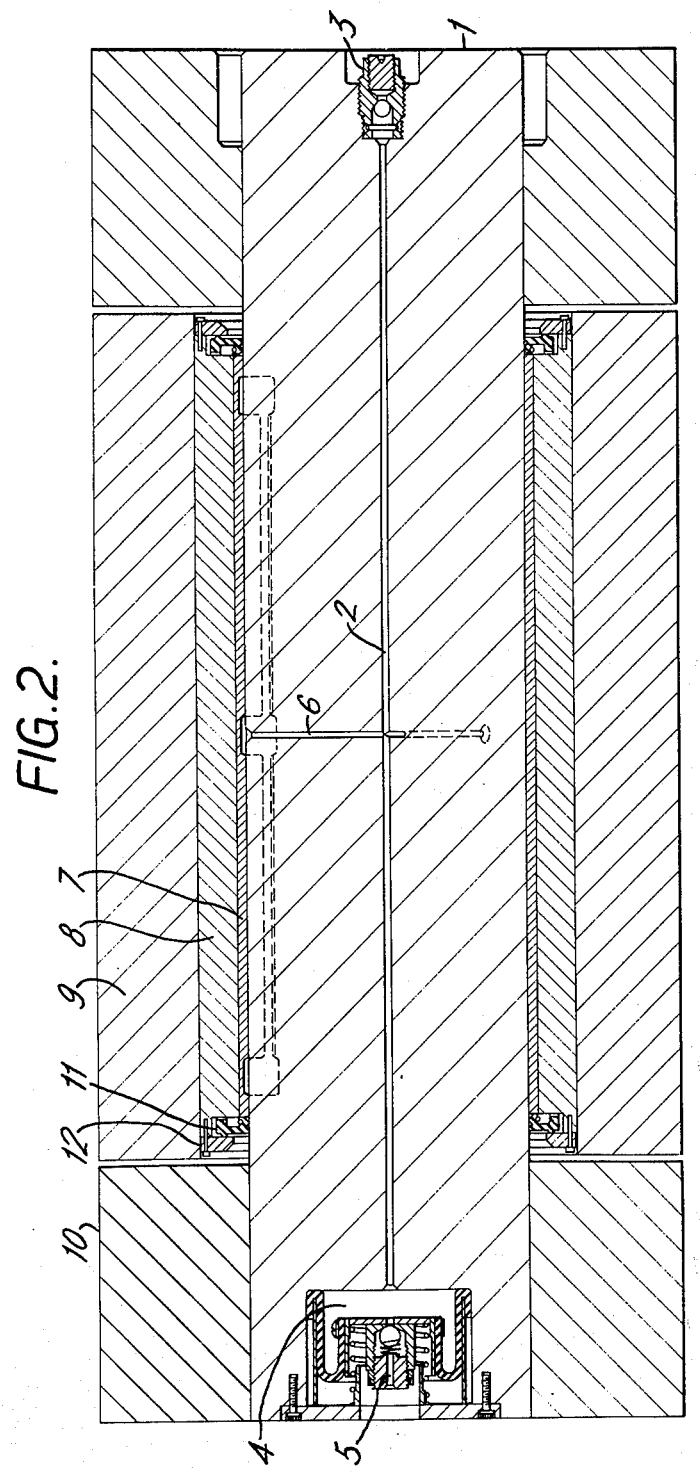
FIG. 2 is a sectional view of a pin bearing according to the present invention.

FIG. 2 shows the bearing pin 1 formed with a duct 2 along its longitudinal axis. A non-return valve 3, disposed at one end of the bearing pin 1, communicates with the duct 2. A lubrication system is disposed at the other end of the bearing pin 1. At least one duct 6 connects the lubrication system, via duct 2, to the bearing surfaces. The bearing pin is rotatable in a bush 7, which bush 7 is disposed within an outer bush 8. The bush 7 is provided with channels formed in its inside surface to facilitate distribution of lubricant over the entire bearing surfaces. The outer bush 8 is disposed in a bearing member 9 which may be, for example, a dredge bucket. A second member 10, for example another dredge bucket, is fixed to the bearing pin 1. A sealing ring 11 is disposed in a recess at each end of the bush 8 and is urged against the bush by an annular plate 12. The annular plate 12 is secured to the outer bush 8 by, for example, Allen screws.

In an unillustrated embodiment of the invention, the non-return valve is situated at the same end of the bearing pin as the lubrication system.

The bush 7 may be made of, for example, bronze or hard gunmetal and the outer bush 8 may be made of, for example, alloy steel. The bearing pin may be made of, for example steel which is covered with a layer of hard chrome.

In an unillustrated embodiment of the invention, the outer bush 8 may have a key-way cut the full length of the outer bush and the bush 7 may have one or more notches formed in its outer surface so that the bush 7 and the outer bush 8 can be prevented from rotating relative to one another by inserting a key member into the gap formed between the key-way and a notch. If, for example, there are three notches formed in the outer surface of the bush 7 such that the notches are spaced circumferentially equidistant, then the bush 7 may be removed from the outer bush 8 from time to time and replaced in the outer bush such that the key member cooperates with a different notch. In this way, the wear on the bush 7 may be distributed more evenly.

Figure 3:
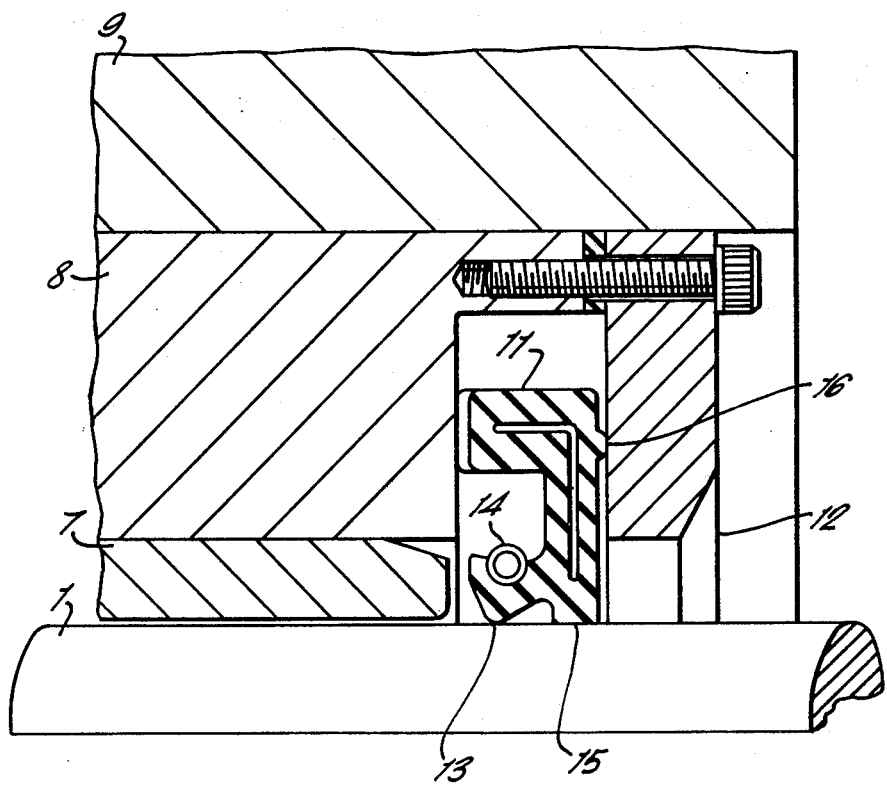
FIG. 3 is a sectional view showing the arrangement of a sealing ring.

Referring to FIG. 3, a lip 13 of the sealing ring 11 is urged against the bearing pin 1 by a garter spring 14. The sealing ring 11 is formed with a cylindrical surface 15 which rests on the surface of the bearing pin for maintaining the sealing ring in a fixed position relative to the bearing pin 1, which cylindrical surface also provides additional protection against the ingress of particles. The sealing ring 11 is also formed with an annular ring 16 which projects from the sealing ring and which is urged against the annular plate 12 to form a seal. That part of the sealing ring 11 which is urged against the outer bush is notched to allow lubricant to flow to the seal between the annular plate 12 and the annular ring 16 which projects from the surface of the sealing ring. The sealing ring is so designed that it rotates with the bearing pin and rubs against the annular ring 16, which annular ring can be renewed if it becomes worn. Should the bearing pin move from side to side due to, for example, relative movement between the members 9 and 10, the sealing rings slide along the bearing pin and so prevent unwanted stresses in the sealing rings.

Figure 4:
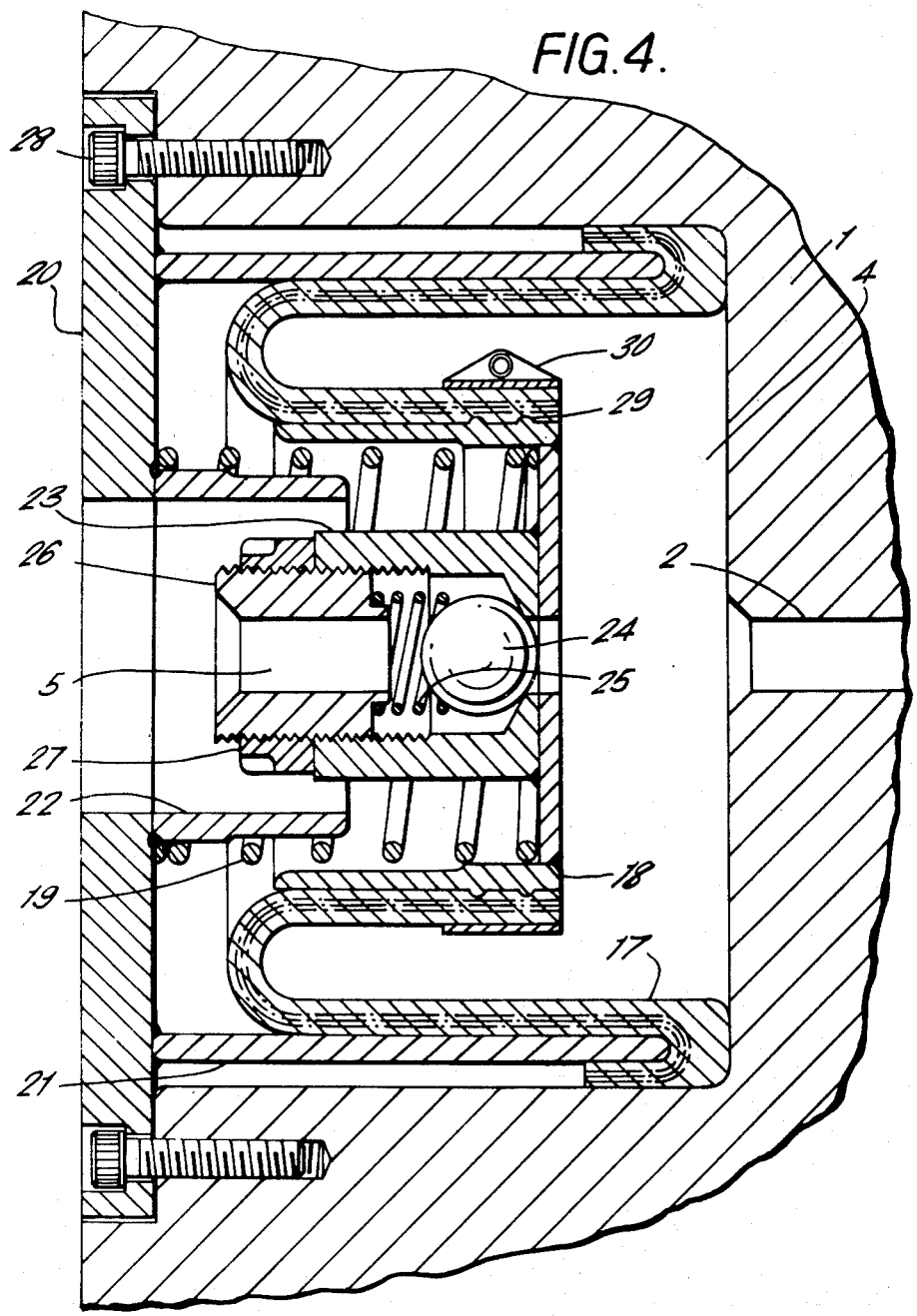
FIG. 4 is an enlarged sectional view of part of FIG. 2 showing the lubrication system.

Referring to FIG. 4, the lubrication system includes a reservoir 4 formed in the bearing pin 1. The reservoir 4 communicates with the non-return valve 3 via the duct 2 so that the reservoir can be filled with lubricant. At least one duct 6 connects the reservoir, via duct 2, to the bearing surface formed between the bearing pin 1 and the bush 7. The reservoir 4 is closed by a diaphragm which comprises a flexible sleeve 17 made of, for example, rubber and a rigid spring-retaining cup 18. The flexible sleeve 17 is clamped to the spring-retaining cup 18 by a collar 30 and is held in place by ridges 29 formed on the surface of the spring-retaining cup. A coil spring 19 is housed in the spring-retaining cup and acts between the diaphragm and an annular plate 20 fastened to the bearing pin 1. The annular plate 20 is provided with two cylindrical flanges 21 and 22 and is fixed to the bearing pin by, for example, Allen screws 28. The outer flange 21 seals the flexible sleeve 17 with the bearing pin and maintains the flexible sleeve in position and the inner flange 22 maintains the spring 19 in position on the annular plate 20.

A pressure release valve 5 is positioned within the spring 19 and comprises a first hollow cylindrical body 23 fixed, for example by welding or brazing, to the spring-retaining cup 18, a spherical body 24 disposed in the cylindrical body 23, which spherical body is urged against a circular opening communicating with the reservoir 4 by means of a spring 25, a second hollow cylindrical body 26 and a lock nut 27 which prevents the second hollow cylindrical body 26 moving relative to the first hollow cylindrical body 23. The pressure release valve prevents over-filling of the lubrication system with lubricant.

In operation, the reservoir 4 is charged by injecting lubricant under pressure through the non-return valve 3, which lubricant passes along the duct 2 and enters the reservoir thus expanding the reservoir and compressing the spring 19. If the pressure difference between the pressure in the reservoir and the pressure prevailing outside the pin bearing exceeds a certain predetermined value the pressure release valve 5 opens and allows excess lubricant to escape from the reservoir until the pressure difference is reduced. Lubricant is supplied to the bearing surfaces from the reservoir via ducts 2 and 6 and is distributed over the bearing surfaces by channels cut in the bush 7. The sealing rings 11 prevent lubricant escaping from the bearing but, in time, these sealing rings become worn and allow some lubricant to escape. Loss of lubricant in the bearing causes the pressure of the lubricant in the bearing to drop and this pressure drop is transmitted along the ducts 6 and 2 to the reservoir 4. The pressure drop in the reservoir causes the spring 19 to expand thus moving the diaphragm and reducing the volume of the reservoir until the pressure in the reservoir is restored. Lubricant thus passes along the ducts 2 and 6 to the bearing surfaces until the lost lubricant is replaced and the pressure of the lubricant in the bearing is restored.

Thus, the diaphragm balances the pressure of the lubricant in the bearing with the pressure prevailing outside the system as well as providing an additional pressure to compensate for loss of lubricant. Advantageously, the pressure of the lubricant is about 3–5 p.s.i. above the pressure prevailing outside the bearing at all times. The position of the diaphragm relative to the bearing pin can be used as a means of determining the quantity of lubricant remaining in the reservoir.

It will be obvious to one skilled in the art that, although the pin bearing is described herein with reference to dredging, such a pin bearing can be used for many other applications and that many changes can be made to the pin bearing without departing from the scope of the invention.

I claim:

1. A pin bearing lubrication system comprising:
   a pin bearing having a bush recessed each end thereof;
   a sealing ring disposed in each recess in the bush;
   a bearing pin passing through the bush and forming seals with the sealing rings;
   a reservoir for lubricant formed in the bearing pin;
   a duct formed in the bearing pin connecting the reservoir with bearing surfaces formed between the bush and the bearing pin; and
   a diaphragm moveable in and relative to the reservoir biasing means causing reduced volume in the reservoir,
   the arrangement being such that the diaphragm is acted upon by the pressure prevailing outside the bearing pin and by said biasing means so as to urge the diaphragm in a direction tending to reduce the volume of the reservoir.

2. A pin bearing lubrication system as claimed in claim 1, wherein the bush is provided with channels formed in its inside surface.

3. A pin bearing lubrication system as claimed in claim 1, wherein the bush comprises an inner bush and an outer bush.

4. A pin bearing lubrication system as claimed in claim 1, wherein the sealing rings are retained in the recesses by means of annular plates secured to the bush.

5. A pin bearing lubrication system as claimed in claim 4, wherein each sealing ring is formed with an annular ring which projects from the sealing ring and which is urged against the annular plate to form a seal.

6. A pin bearing lubrication system as claimed in claim 1, wherein each sealing ring is urged against the bearing pin by a garter spring.

7. A pin bearing lubrication system as claimed in claim 1, wherein each sealing ring is formed with a cylindrical surface which rests on the surface of the bearing pin.

8. A pin bearing lubrication system as claimed in claim 1, wherein that part of each sealing ring abutting the bush is formed with notches.

9. A pin bearing lubrication system as claimed in claim 1, wherein the sealing rings are made of an elastomeric material.

10. A pin bearing lubrication system as claimed in claim 1, wherein the diaphragm comprises a flexible sleeve fastened around a rigid portion.

11. A pin bearing lubrication system as claimed in claim 10, wherein the biasing means comprises a coil spring which acts between the rigid portion and an annular plate secured to the bearing pin.

12. A pin bearing lubrication system as claimed in claim 1, wherein the system further comprises a pressure valve which is opened or closed depending on whether the pressure difference between the pressure in the reservoir and the pressure prevailing outside the pin bearing is greater than or less than a predetermined value.

13. A pin bearing lubrication system as claimed in claim 1, wherein, in use, the system maintains the pressure in the reservoir at least 3 p.s.i above the pressure prevailing outside the pin bearing.

14. A pin bearing lubrication system as claimed in claim 1, wherein, in use, the system maintains the pressure in the reservoir up to 5 p.s.i. above the pressure prevailing outside the pin bearing.

15. A pin bearing lubrication system comprising:
a pin bearing having a bush recessed each end thereof;
a sealing ring disposed in each recess in the bush;
a bearing pin passing through the bush and forming seals with the sealing rings;
a reservoir for lubricant formed in the bearing pin;
a duct formed in the bearing pin connecting the reservoir with bearing surfaces formed between the bush and the bearing pin; and
a diaphragm movable in and relative to the reservoir;
wherein the diaphragm comprises a flexible sleeve fastened around a rigid portion, the arrangement being such that the diaphragm is acted upon by the pressure prevailing outside the bearing pin and by a coil spring acting between the rigid portion and an annular plate secured to the bearing pin so as to urge the diaphragm in a direction tending to reduce the volume of the reservoir.

16. In a chain of dredge buckets hinged together by pin bearings, the improvement which comprises a pin bearing lubrication system consisting essentially of
a pin bearing having a bush recessed each end thereof;
a sealing ring disposed in each recess in the bush;
a bearing pin passing through the bush and forming seals with the sealing rings;
a reservoir for lubricant formed in the bearing pin;
a duct formed in the bearing pin connecting the reservoir with bearing surfaces formed between the bush and the bearing pin; and
a diaphragm movable in and relative to the reservoir, biasing means causing reduced volume in the reservoir,
the arrangement being such that the diaphragm is acted upon by the pressure prevailing outside the bearing pin and by said biasing means so as to urge the diaphragm in a direction tending to reduce the volume of the reservoir.

* * * * *